(12) United States Patent
Yoshii et al.

(10) Patent No.: US 9,551,396 B2
(45) Date of Patent: Jan. 24, 2017

(54) VIBRATION DAMPING DEVICE

(71) Applicants: SUMITOMO RIKO COMPANY LIMITED, Komaki-shi, Aichi (JP); TOYOTA JIDOSHA KABUSHIKI KAISHA, Toyota-shi, Aichi (JP)

(72) Inventors: Noriaki Yoshii, Nagoya (JP); Hiroki Mizukawa, Kasugai (JP); Yorishige Shimizu, Iwakura (JP); Hiroyuki Ichikawa, Kani (JP); Katsuhiko Katagiri, Komaki (JP); Shinji Komura, Toyota (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/443,218

(22) PCT Filed: Jun. 2, 2014

(86) PCT No.: PCT/JP2014/064644
§ 371 (c)(1),
(2) Date: May 15, 2015

(87) PCT Pub. No.: WO2015/008549
PCT Pub. Date: Jan. 22, 2015

(65) Prior Publication Data
US 2016/0116018 A1 Apr. 28, 2016

(30) Foreign Application Priority Data
Jul. 16, 2013 (JP) .................................. 2013-147209

(51) Int. Cl.
*F16F 1/36* (2006.01)
*F16F 15/08* (2006.01)
(Continued)

(52) U.S. Cl.
CPC ............. *F16F 15/08* (2013.01); *B60K 5/1208* (2013.01); *F16F 1/371* (2013.01); *F16F 1/44* (2013.01);
(Continued)

(58) Field of Classification Search
CPC ................ F16F 1/54; F16F 1/371; F16F 1/36; F16F 1/373; F16F 1/3842; F16F 1/3849; F16F 3/12; F16F 2236/123; B60K 5/1208; B60K 5/1233
(Continued)

(56) References Cited

U.S. PATENT DOCUMENTS

| 1,872,259 A | * | 8/1932 | Eldridge | ............... B60K 5/1266 267/140.3 |
| 2002/0014727 A1 | | 2/2002 | Takashima et al. | |

FOREIGN PATENT DOCUMENTS

| FR | 2698426 A1 * | 5/1994 | ............ F16F 1/3713 |
| JP | 09242821 A * | 9/1997 | |

(Continued)

OTHER PUBLICATIONS

May 28, 2015 Office Action issued in Japanese Patent Application No. 2013-147209.
(Continued)

*Primary Examiner* — Bradley King
*Assistant Examiner* — Stephen Bowes
(74) *Attorney, Agent, or Firm* — Oliff PLC

(57) ABSTRACT

Provided is a vibration damping device having a novel structure and that can have a greatly increased load strength resistance without a concomitant increase in the number of components or size at a stopper mechanism. The structure is such that first and second stopper portions having a hanging plate part and a dip part are provided to a pair of opposing sides of a stopper plate of a vibration damping device,
(Continued)

whereas a pair of side plate portions extending between the first and second stopper portions are provided to the other pair of opposing sides of the stopper plate, and openings at both sides of the first and second stopper portions are closed by the pair of side plate portions.

6 Claims, 10 Drawing Sheets

(51) Int. Cl.
   *F16F 1/44* (2006.01)
   *F16F 1/371* (2006.01)
   *B60K 5/12* (2006.01)

(52) U.S. Cl.
   CPC ........ *B60K 5/1216* (2013.01); *F16F 2224/025* (2013.01)

(58) Field of Classification Search
   IPC .......................................................... F16F 1/36
   See application file for complete search history.

(56) References Cited

FOREIGN PATENT DOCUMENTS

| | | | | |
|---|---|---|---|---|
| JP | 11351329 | A | * | 12/1999 |
| JP | 2000297837 | A | | 10/2000 |
| JP | 2001165242 | A | | 6/2001 |
| JP | 2002130375 | A | * | 5/2002 |
| JP | 2002295587 | A | * | 10/2002 |
| JP | 2005113968 | A | | 4/2005 |
| JP | 2007120672 | A | | 5/2007 |
| JP | 2008-144921 | A | | 6/2008 |
| JP | 2008232390 | A | * | 10/2008 |
| JP | 2009008251 | A | | 1/2009 |
| JP | 2010180930 | A | * | 8/2010 |
| JP | 5085403 | B2 | | 11/2012 |

OTHER PUBLICATIONS

Jan. 19, 2016 International Preliminary Report on Patentability issued in International Patent Application No. PCT/JP2014/064644.
Jun. 22, 2016 Office Action issued in Chinese Application No. 2014-80028944.8.

* cited by examiner

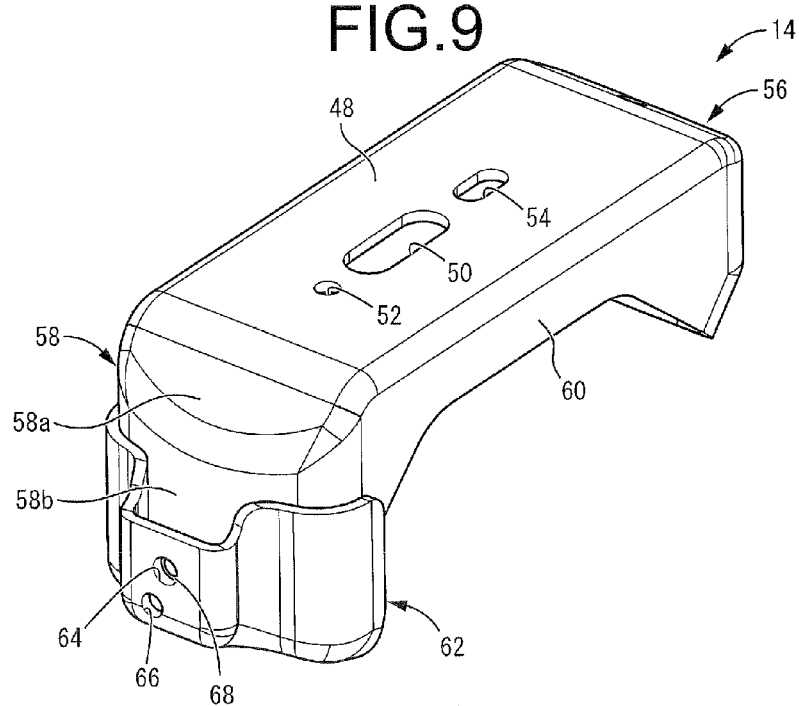
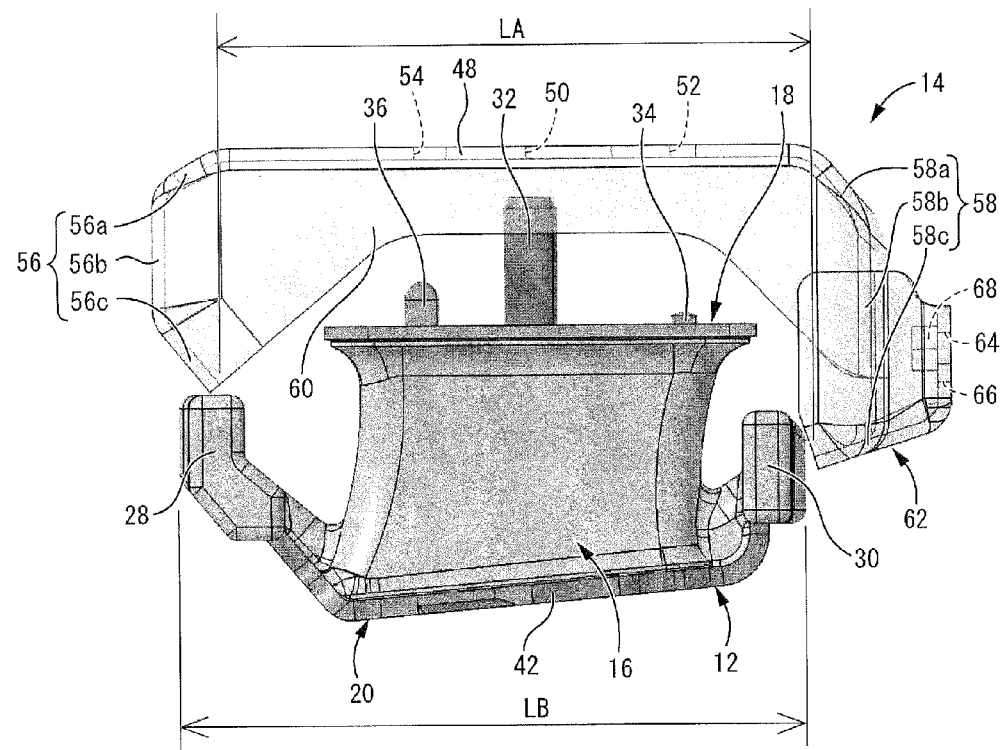

PRIOR ART

VIBRATION DAMPING DEVICE

TECHNICAL FIELD

The present invention relates to a vibration damping device that can be used for an engine mount for motor vehicles, for example, especially to a vibration damping device with a novel structure having a stopper mechanism that limits relative displacement between the members to be connected to each other in a vibration damping manner.

BACKGROUND ART

There has been known a vibration damping device, as a type of vibration damping device arranged between members to be connected to each other in a vibration damping manner, having a first mounting plate member and a second mounting plate member connected by a main rubber elastic body. Such a vibration damping device is used for an engine mount, a body mount or the like for motor vehicles, and in an FR (front-engine rear-drive) type vehicle, for example, it is generally arranged obliquely at respective positions diagonally below the engine of the power unit sandwiching the engine so as to support the power unit by the vehicle body in a vibration damping manner (see FIG. 1 of Patent Document 1).

In such a vibration damping device, a stopper mechanism is often provided to restrict not only the amount of elastic deformation of the main rubber elastic body but also relative displacement between members to be connected in a vibration damping manner. This stopper mechanism is constituted, for example, by means of installing a stopper plate to the first plate member in an overlapping manner to provide a stopper portion between a stopper plate and the second mounting plate member so that the first mounting plate member and the second mounting plate member get in contact with each other when they are relatively displaced.

However, an engine mount for motor vehicles, for example, requires the stopper function in various directions in order to restrict relative displacement of the power unit against the vehicle body, and it has been difficult to achieve the stopper function in various directions with a simple structure and a saved space. More specifically, in case of an engine mount for an FR type vehicle mentioned above, the stopper function is required not only against inputs in downward and left-right directions during regular driving but also against large inputs in the backward and diagonally upward direction at the time of vehicular collision.

Now, the inventor of the present invention designed, as shown in FIGS. 16 and 17 for example, a stopper mechanism that can perform the stopper function in multiple directions based on abutment of the stopper portions 3, 4 against the corresponding abutting portions 6, 7, respectively, by means of forming the stopper portions 3, 4 on a pair of opposing sides of the stopper plate 2 overlapped with the first mounting plate member 1, while providing the pair of abutting portions 6, 7 at corresponding positions on the second mounting plate member 5. This stopper mechanism was designed to perform the stopper function by cutting an opening window 8 on the stopper portion 3 and outwardly extending the plate-shaped engaging piece 9 that protrudes from the abutting portion 6 through the opening window 8, and then abutting the stopper portion 3 against the engaging piece 9 of the abutting portion 6 between the first and second mounting plate members 1, 5 also in the direction of separating from each other.

However, according to further studies by the inventor of the present invention, it was found that there is a risk of not being able to perform the intended stopper function in a stable manner, once the input load in the backward and diagonally upward direction becomes excessive as a consequence of weight increase of the power unit resulting in an increase in the amount of deformation of the stopper portion 3 provided with the plate-shaped engaging piece 9 and the opening window 8.

BACKGROUND ART DOCUMENT

Patent Document

Patent Document 1: Japanese Unexamined Patent Publication No. JP-A-2008-232390

SUMMARY OF THE INVENTION

Problem the Invention Attempts to Solve

The present invention has been developed in view of the above-described matters as the background, and it is an object of the present invention to provide a vibration damping device with a novel structure which is able to significantly enhance the load-bearing strength of the stopper mechanism without accompanying any increase in size and the number of parts thereof.

Means for Solving the Problem

The above and/or optional objects of this invention may be attained according to at least one of the following aspects of the invention. The following aspects and/or elements employed in each mode of the invention may be adopted at any possible optional combinations.

A first aspect of the present invention provides a vibration damping device wherein first and second mounting plate members configured to attach to respective components to be connected in a vibration damping manner are placed opposite to each other and connected by a main rubber elastic body, a stopper plate of approximately rectangular shape is overlapped and attached on the first mounting plate member, and first and second stopper portions are provided to pair of opposing sides of the stopper plate so as to limit an amount of relative displacement between the first and second mounting plate members by abutment against respective abutting portions provided to the second mounting plate member, the vibration damping device being characterized in that: a dip part is provided so as to slope inward from a tip of a hanging plate part that extends from each of the first and second stopper portions provided to the respective opposing sides of the stopper plate toward the second mounting plate member; and a pair of side plate portions each protruding toward the second mounting plate member are provided to another pair of opposing sides of the stopper plate so as to extend between the first and second stopper portions and close an opening to each side of the first and second stopper portions.

In the vibration damping device with the structure according to the present aspect, the first and second stopper portions at the pair of opposing sides of the stopper plate each have a dip angle and are formed in an approximate shape of a bag that opens toward each other by having each opening on the side closed by the side plate portions. In addition, each side plate portion of these first and second stopper portions is structured to extend continuously all the way between the first and second stopper portions on the other pair of opposing sides of the stopper plate.

Therefore, it becomes possible to stably obtain the stopper function against relative displacement of the first and second mounting plate members in the direction of separating from each other such as the one inputted to an engine mount for motor vehicles, for example, at the time of collision of the vehicle based on the abutment of the dip parts provided in the first and second stopper portions against each abutting portion of the second mounting plate member.

In addition, due to the fact that the first and second stopper portions are made in an approximate shape of a bag and the side plate portions on both sides are connected to each other, it is possible to ensure the load-bearing strength of the stopper plate including the first and second stopper portions without no need for special reinforcing members or else, thus enabling to obtain an effective stopper function against any excessive load such as the one inputted to an engine mount for motor vehicles at the time of collision, for example.

A second aspect of the present invention provides the vibration damping device according to the first aspect, wherein a portion of the second stopper portion of the stopper plate including the dip part comprises a separate component attached later.

As to the vibration damping device with the structure according to the present aspect, it becomes possible to easily manufacture a stopper plate provided with the first and second stopper portions each having a dip part on both of the opposing sides. That is, in manufacturing the first and second stopper portions in an approximate shape of a bag opening toward each other by press-forming or the like, by constructing the dip part of one of the stopper portions with a separate component, it is now possible to easily remove the mold of the stopper plate.

A third aspect of the present invention provides the vibration damping device according to the first or second aspect, wherein a mounting bolt protruding outward is provided to the first mounting plate member, a bolt insertion hole for insertion of the mounting bolt is provided to the stopper plate, a first positioning protrusion and a second positioning protrusion with a protrusion height greater than that of the first positioning protrusion are provided to the first mounting plate member so as to be located on both sides of the mounting bolt in a direction of opposition of the first and second stopper portions of the stopper plate so that the first positioning protrusion positions the stopper plate with respect to the first mounting plate member while a second positioning protrusion positions the first mounting plate member with respect to one of the components to be connected in a vibration damping manner, first and second insertion holes are provided to the stopper plate on both sides of the bolt insertion hole at locations corresponding to the respective first and second positioning protrusions, the first insertion hole fits the first positioning protrusion about an entire circumference, and the bolt insertion hole and the second insertion hole each have an elongated shape extending in a direction of opposition of the first and second stopper portions of the stopper plate so that the stopper plate is allowed to tilt with respect to the first mounting plate member in a direction of lifting its side on the first insertion hole while the second positioning protrusion is positioned with respect to the second insertion hole in a direction of opposition of the pair of side plate portions of the stopper plate.

In the vibration damping device with the structure according to the present aspect, it becomes possible to assemble the stopper plate to the first mounting plate member easily by inserting the mounting bolt provided to protrude therefrom as well as the first and second positioning protrusions through each insertion hole made on the stopper plate while maintaining a large degree of freedom in designing the inclination angle and sizes and the like of the dip part of the first and second stopper portions.

That is, the stopper plate with the first and second stopper portions each having a dip angle on both of the opposing sides thereof according to the present invention has a risk of having difficulties in overlapping the stopper plate with the outer face of the first mounting plate member to assemble it thereto if the dip part or the dip angle given thereto gets larger. That is because the first mounting plate member generally has a mounting bolt protruding therefrom for fixing it to members to be connected in a vibration damping manner, and since the mounting bolt has to be inserted through the bolt insertion hole provided on the stopper plate in the assembly process of the stopper plate, the stopper plate needs to be overlapped from above with the first mounting plate member to be assembled thereto, and the dip part can sometimes be stuck with the abutting portion of the second mounting plate member during the overlapping process.

Especially, the first mounting plate member is often provided with not only the mounting bolt but also the first positioning protrusion for positioning the stopper plate against the first mounting plate member and the second positioning protrusion for positioning the first mounting plate member against members to be connected in a vibration damping manner. And, in assembling the stopper plate to the first mounting plate member, the first and second positioning protrusions have to be inserted into the first and second insertion holes provided at each position on the stopper plate. Therefore, the assembling direction of the stopper plate relative to the first mounting plate member is restricted more strictly so that the configuration of the dip part is limited in order to avoid the dip part from being caught by the abutting portion, which sometimes caused difficulties in fulfilling the intended stopper function.

Under these circumstances, in the vibration damping device with the structure according to the third aspect of the present invention described above, since the bolt insertion hole and the second insertion hole are both elongated and the tilting of the stopper plate to lift up its first insertion hole side is allowed, it becomes possible to easily assemble the stopper plate to the first mounting plate member without having the stopper portion caught by the abutting portion even when the dip angle of the stopper portion of the stopper plate is too large.

At this time, the first positioning protrusion is made smaller in height than the second positioning protrusion, while being positioned at a location further away from the tilting axis of the stopper plate than the mounting bolt and the second positioning protrusion. Therefore, in assembling the first mounting plate member by tilting the stopper plate to avoid the stopper portion from being caught by the abutting portion, the tilting angle of the stopper plate is already reduced or made almost parallel to the first mounting plate member at the stage of insertion of the first positioning protrusion into the first insertion hole, thus effectively avoiding assembly failure of the stopper plate due to the first positioning protrusion being caught by the surrounding area of the first insertion hole.

Then, in overlapping the stopper plate with the first mounting plate member in close contact, since the first positioning protrusion is fitted into the first insertion hole all around the circumference, while the second positioning protrusion is locked in position against the second insertion hole in one direction, it is now possible to position the stopper plate against the first mounting plate member in a reliable and high-precision manner.

A fourth aspect of the present invention provides the vibration damping device according to the third aspect, wherein the mounting bolt is positioned with respect to the bolt insertion hole in the direction of opposition of the pair of side plate portions of the stopper plate.

In the vibration damping device with the structure according to the present aspect, when the stopper plate is overlapped with the first mounting plate member in close contact, not only fitting and locking effects of the first and second positioning protrusions against the first and second insertion holes but also their locking effects against the bolt insertion hole of the mounting bolt are exerted, thereby enabling to position the stopper plate against the first mounting plate member in a more reliable and rigorous manner.

A fifth aspect of the present invention provides the vibration damping device according to the third or fourth aspect, wherein at least one of the first positioning protrusion and the second positioning protrusion has a tapered shape where a cross sectional area of its tip portion is smaller than that of its base portion.

In the vibration damping device with the structure according to the present aspect, the tapered shape of the first positioning protrusion or the second positioning protrusion makes it possible to prevent it from being caught by the first or second insertion hole during the insertion in a more effective manner, thus enabling to further improve the assembly workability of the stopper plate to the first mounting plate member.

A sixth aspect of the present invention provides the vibration damping device according to any one of the third to fifth aspects, wherein the protrusion height of the first positioning protrusion is set at a level not protruding beyond an outer face of the stopper plate.

In the vibration damping device with the structure according to the present aspect, the catching described above between the stopper plate and the first mounting plate member during the assembly can be avoided in a more effective manner by limiting the height of the first positioning protrusion, while failures such as interference by the first positioning protrusion with members to be connected to the first mounting plate member in a vibration damping manner can be fully prevented.

A seventh aspect of the present invention provides the vibration damping device according to any one of the first to sixth aspects, wherein the vibration damping device is configured to be located diagonally below an engine of a power unit on each side across the engine and arranged obliquely so as to constitute an engine mount.

Using the vibration damping device with the structure according to the present aspect, it becomes possible to set a large dip angle for the stopper portion or set a dip angle for each of the stopper portions without interfering with the assembly of the stopper plate to the first mounting plate member. That makes it possible to fulfill the stopper function that limits the amount of displacement of the power unit with a higher degree of freedom in setting the direction and the like of the stopper function. Especially in an automobile engine mount, an effective stopper function can be exerted with significant load-bearing performance even against an excessive load applied in the diagonally upward direction at the time of vehicular collision due to the stopper function that restricts relative displacement between the first and second mounting plate members in the direction of separating from each other.

Effect of the Invention

According to the vibration damping device with the structure of the present invention, by adopting the first and second stopper portions each with a special structure that has a dip angle and is closed at the opening on both sides by the side plate portions connected to each the other, a stopper function is made possible with excellent load-bearing performance effective against load inputs in multiple directions including the separating direction of the first and second mounting plate members.

BRIEF DESCRIPTION OF THE DRAWINGS

FIG. 9 is a perspective view of the stopper plate shown in FIG. 7.

FIG. 10 is a view suitable for explaining the assembly work by overlapping the stopper plate shown in FIG. 7 to the mount body shown in FIG. 6.

EMBODIMENTS FOR CARRYING OUT THE INVENTION

In order to clarify the present invention more specifically, embodiments of the present invention will be described in detail below in reference to the drawings.

Figure 6:
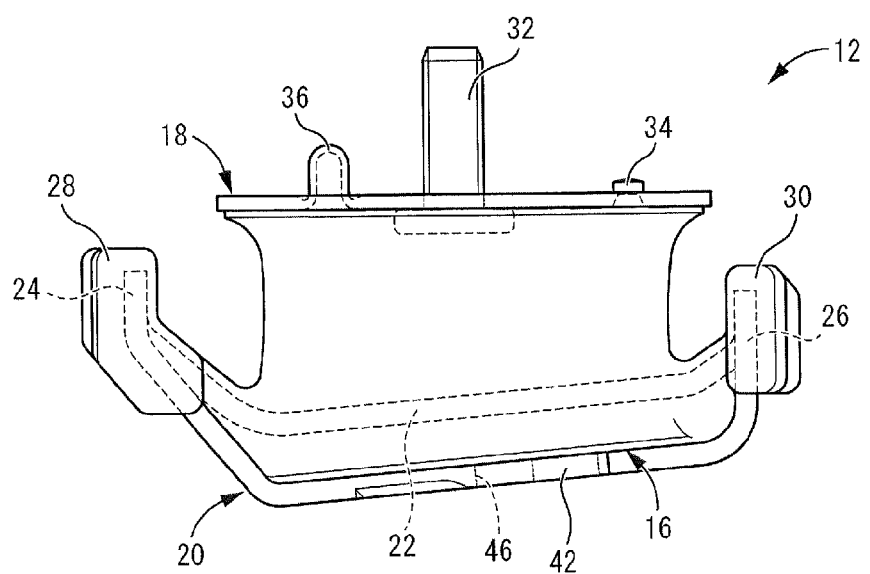
FIG. 6 is a front view of a mount body of the engine mount shown in FIG. 1.
Figure 7:
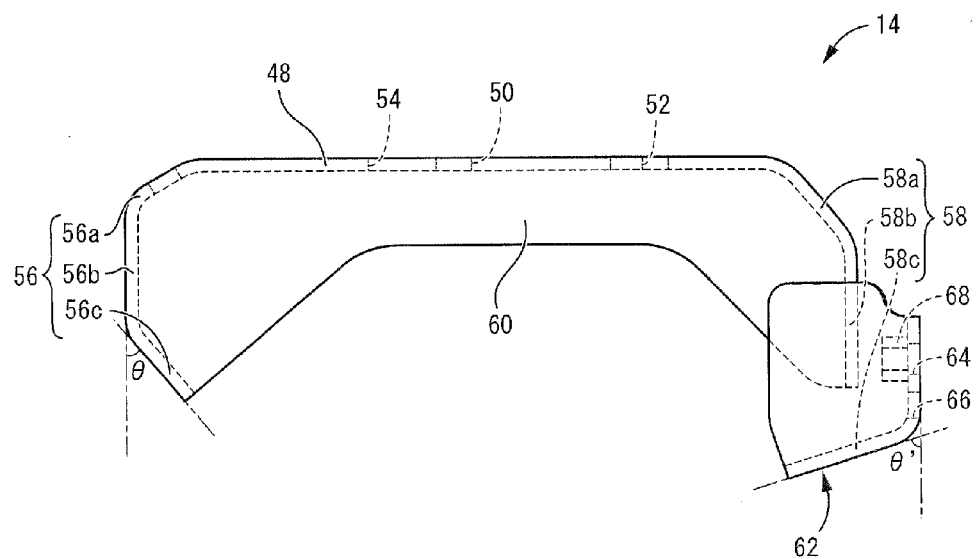
FIG. 7 is a front view of a stopper plate of the engine mount shown in FIG. 1.
Figure 8:
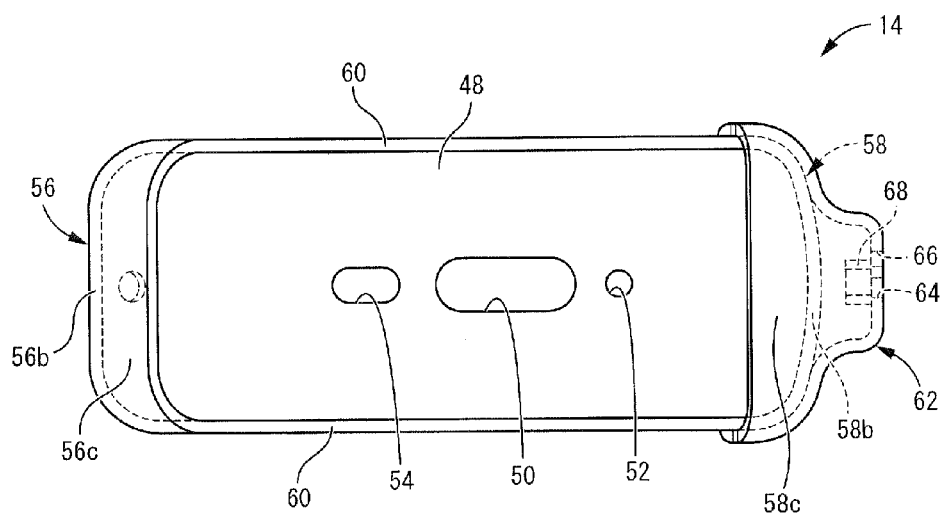
FIG. 8 is a bottom view of the stopper plate shown in FIG. 7.

First of all, FIGS. 1 to 5 show an engine mount 10, which is a vibration damping device as a first embodiment of the present invention. The engine mount 10 is a rectangular mount having a structure where a stopper plate 14 shown in FIGS. 7 to 9 is assembled to a mount body 12 shown in FIG. 6.

Explaining in more detail, the mount body 12, as shown in FIGS. 1 to 6, has a main rubber elastic body 16 in an approximate shape of a rectangular block, which elastically connects a first mounting plate member 18 and a second mounting plate member 20 to each other. In other words, the first mounting plate member 18 and the second mounting plate member 20 are both composed of processed metal plate fittings and the like and are placed opposite to each other at a given distance. Then, between the opposing faces of the first mounting plate member 18 and the second mounting plate member 20, the main rubber elastic body 16 is arranged to which the first and second mounting plate members are bonded by vulcanization. FIGS. 2 to 5 show the main rubber elastic body 16 installed on a vehicle and elastically deformed by the input of the shared support load of the power unit. The main rubber elastic body 16 is not shown in FIG. 3.

The first mounting plate member 18 is made in an approximate shape of a rectangular flat plate as a whole, while the second mounting plate member 20 has a larger dimension in the longitudinal direction than that of the first mounting plate member 18 and is provided with a reinforcing rib 22 extending along the center of the width in the longitudinal direction. Also, on both sides in the longitudinal direction of the second mounting plate member 20, which are the left and right sides in FIGS. 3 and 4, a first abutting portion 24 and a second abutting portion 26 are integrally formed with the main rubber elastic body 16 each protruding outward therefrom.

The first abutting portion 24 and the second abutting portion 26 protrude as if they rise from a pair of opposing peripheral edges of the second mounting plate member 20 toward the first mounting plate member 18, and the bent portions thereof are reinforced by the reinforcing rib 22. Also, a first rubber buffer 28 and a second rubber buffer 30 are formed to cover the surfaces of the first abutting portion 24 and the second abutting portion 26 and bonded thereto by vulcanization. In the present embodiment, the first and second rubber buffers 28, 30 are integrally formed with the main rubber elastic body 16.

Also, in the first mounting plate member 18, a mounting bolt 32 is planted at about the center thereof to protrude outward in the approximately vertical direction. In addition, a first positioning protrusion 34 in the form of a small projection is formed to protrude outward on one side of the mounting bolt 32 in the longitudinal direction of the first mounting plate member 18 (to the right in FIGS. 3, 4 and 6). Meanwhile, on the opposite side of the first positioning protrusion 34 across the mounting bolt 32 in the longitudinal direction of the first mounting plate member 18, a second positioning protrusion 36 is formed to protrude outward in the approximately vertical direction by a height greater than that of the first positioning protrusion 34. In the present embodiment, the protrusion height of the first positioning protrusion 34 is set at a level not protruding beyond the outer face of the stopper plate 14.

Under these circumstances, the first and second positioning protrusions 34, 36 are integrally formed with the first mounting plate member 18 by press-forming in the present embodiment, although it is also possible to form them by welding another material or using fixing rivets or the like.

Also, the first and second positioning protrusions 34, 36 each have a tapered shape where the outside diameter of the tip portion is smaller than that of the base portion. Especially in the present embodiment, the first and second positioning protrusion 34, 36 rise up vertically from the top face of the first mounting plate member with a circular cross-section making a shape of a convex spherical crown at each top.

Also in the present embodiment, the mounting bolt 32 as well as the first and second positioning protrusions 34, 36 are positioned at the center in the width direction of the first mounting plate member 18 being arranged approximately in series along the straight line extending in the longitudinal direction thereof.

Figure 2:
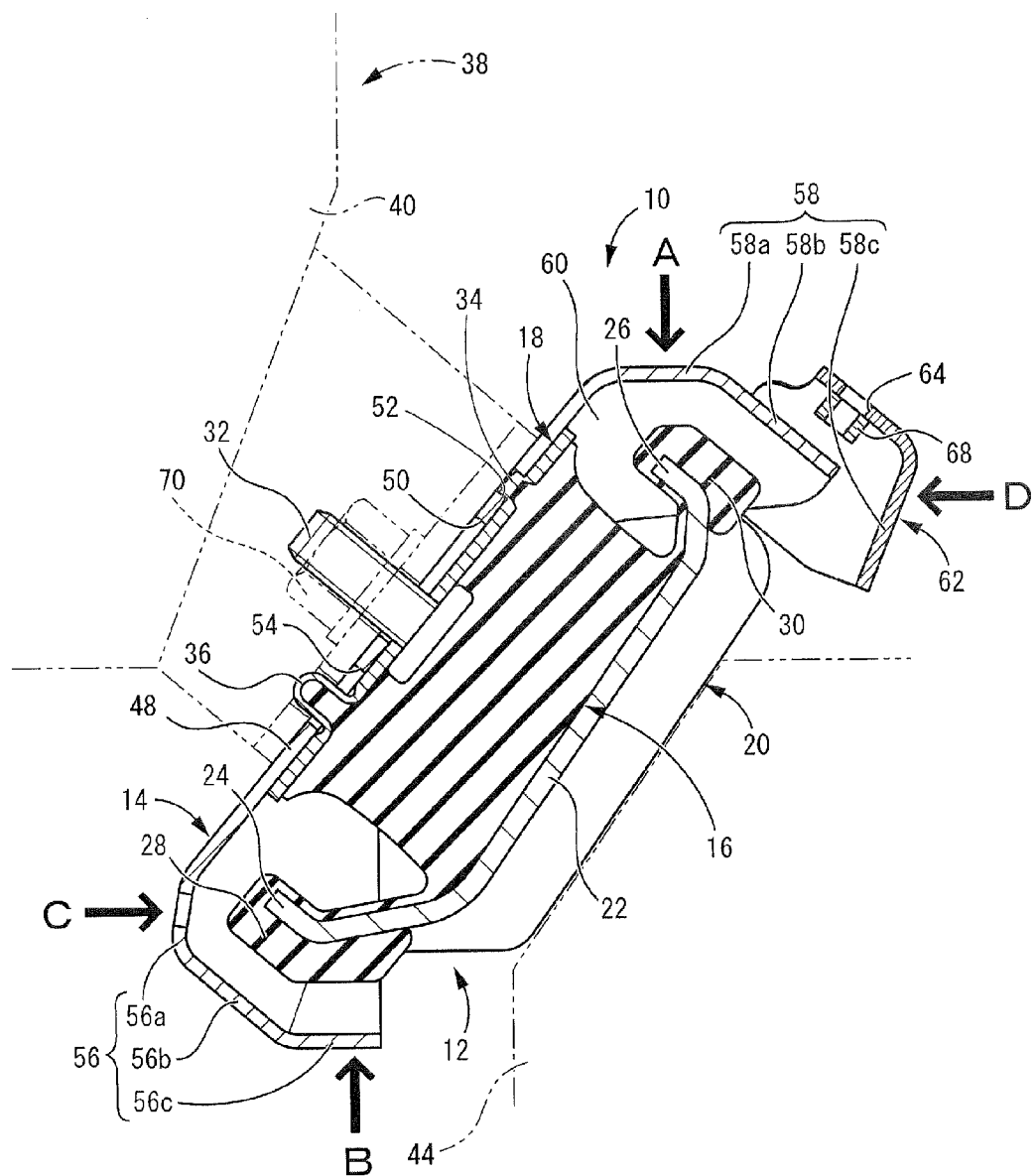
FIG. 2 is a vertical cross sectional view of the engine mount shown in FIG. 1 installed to a vehicle, taken along line 2-2 of FIG. 3.
Figure 3:
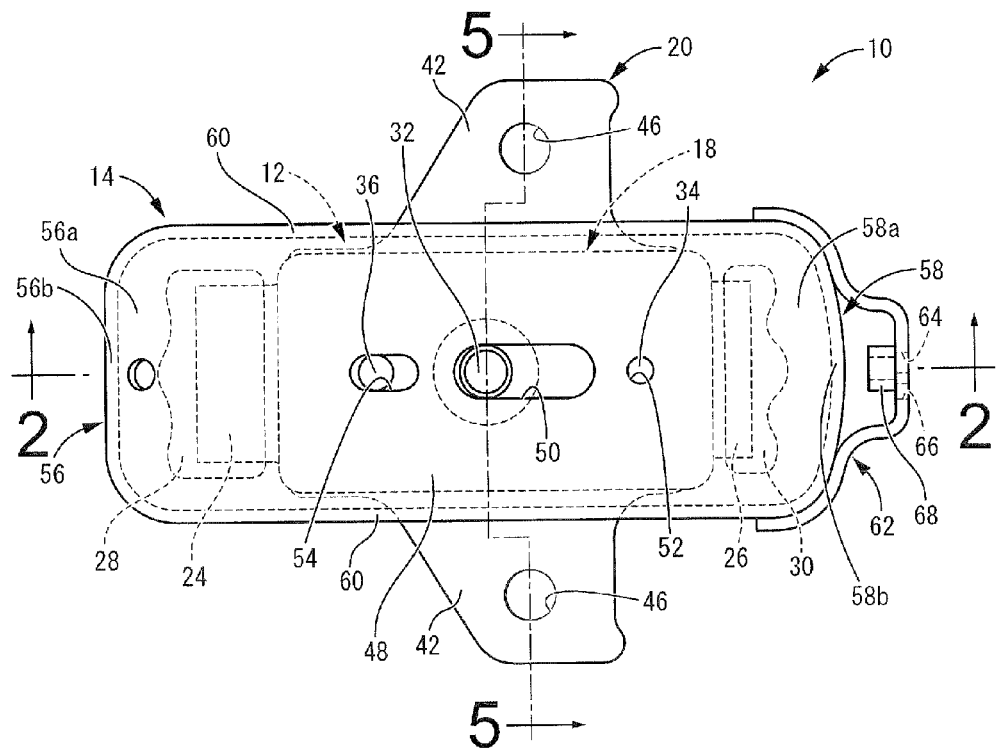
FIG. 3 is a plan view of the engine mount installed to a vehicle shown in FIG. 2.
Figure 4:
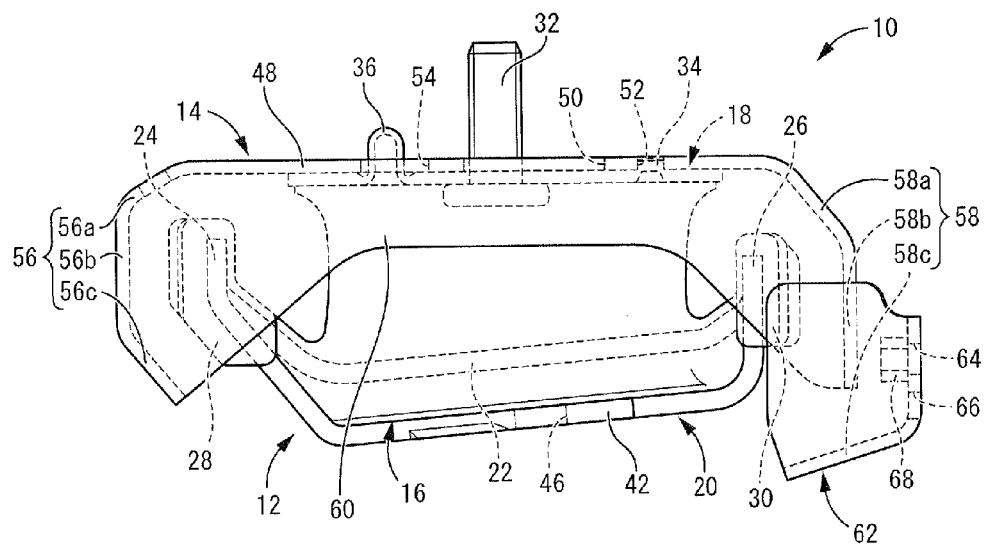
FIG. 4 is a front view of the engine mount installed to a vehicle shown in FIG. 2.
Figure 5:
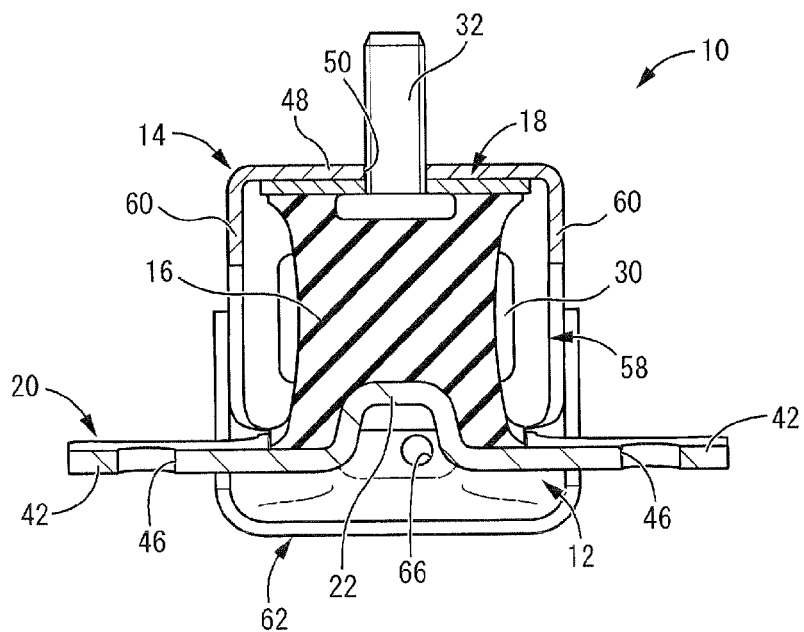
FIG. 5 is a cross sectional view taken along line 5-5 of FIG. 3.

Then, as shown in FIG. 2, the first mounting plate member 18 is configured to be attached to a power unit 38, which is the one component to be connected by the engine mount 10 in a vibration damping manner, by a mounting bolt 32. Especially in the present embodiment, the pair of engine mounts 10, 10 are arranged obliquely at positions diagonally below an engine 40 of the power unit 38 sandwiching the engine 40 from both sides thereof, one of which is shown in FIG. 2.

Figure 1:
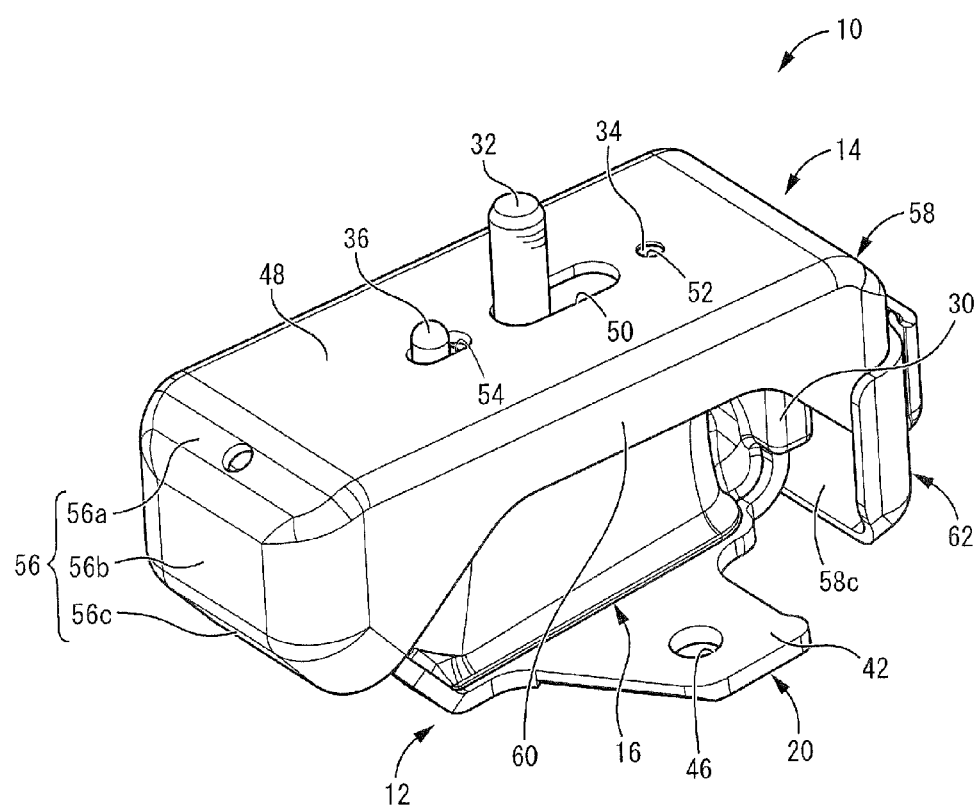
FIG. 1 is a perspective view showing a vibration damping device in the form of an engine mount as a first embodiment of the present invention.

On the other hand, a pair of mounting pieces 42, 42 are integrally formed with the second mounting plate member 20 extending at the center in the longitudinal direction spreading over both sides in the width direction (see FIG. 1 and others). Then, as shown in FIG. 2, the pair of mounting pieces 42, 42 are configured to be overlapped with and attached to a vehicle body 44, which is the other component to be connected by the engine mount 10 in a vibration damping manner, by a fixing blot (not shown) that is inserted into a through hole 46 provided in each mounting piece 42.

Meanwhile, the stopper plate 14 to be assembled to the mount body 12, as shown in FIGS. 7 to 9 as unitary construction, is provided with a central plate portion 48 in an approximate shape of a rectangular flat plate one step larger than the first mounting plate member 18. And, as shown in FIGS. 1 to 5, the central plate portion 48 is overlapped with and assembled to the first mounting plate member 18 in contact with each other across nearly the entire area. On the central plate portion 48, a bolt insertion hole 50 as well as the first and second insertion holes 52, 54 are formed at positions corresponding to the mounting bolt 32 provided on the first mounting plate member 18 to protrude therefrom and the first and second positioning protrusions 34, 36, respectively, for bolt insertion.

Also, on the central plate portion 48 on both sides in the longitudinal direction, that is, at the pair of opposing sides, a first stopper portion 56 and a second stopper portion 58 are integrally formed to protrude in one direction toward the side of the second mounting plate member 20 so as to hang down therefrom in a state of being assembled to the mount body 12.

The first stopper portion 56 and the second stopper portion 58 are each provided with upper inclined plate parts 56*a*, 58*a* that extend in flexion from the central plate portion 48 at an angle of about 30 to 60 degrees, hanging plate parts 56*b*, 58*b* that extend in further flexion from the respective tips of the upper inclined plate parts 56*a*, 58*a* so as to line up at about a right angle to the central plate portion 48, and lower inclined plate parts 56*c*, 58*c* as dip parts that extend at dip angles of $\theta$, $\theta'$ (see FIG. 7) in overhanging forms being further flexed at about 30 to 80 degrees from the respective tips of the hanging plate parts 56*b*, 58*b*.

Also, on the stopper plate 14, a pair of side plate portions 60, 60 are integrally formed to hang down approximately vertically toward the side of the second mounting plate member 20 from both edges in the width direction of the central plate portion 48, that is, the other pair of opposing sides. These pair of side plate portions 60, 60 are integrally connected to both edges of the first stopper portion 56 and the second stopper portion 58 in each width direction at both edges of the stopper plate 14 in the longitudinal direction.

This allows the first and second stopper portions 56, 58 and the pair of side plate portions 60, 60 to be formed as peripheral walls extending in a skirt-like shape as a whole. Also, the first stopper portion 56 and the second stopper portion 58 are each made in a bag-like shape by having the openings on both sides in the width direction covered by the pair of side plate portions 60, 60. Then, the first and second abutting portions 24, 26 are arranged to be inserted from the respective openings thereof into the stopper portions 56, 58 that are strengthened by the formation of a bag-like shape, and the first and second stopper portions 56, 58 are arranged to cover the first and second abutting portions 24, 26 over their sides to enclose them around the periphery.

The stopper plate 14 described above can be formed either by press-forming including deep drawing or bending of a blank flat metal plate, or by dividing a plate into a plurality of pieces and joining them by welding or the like to produce an integral part. In the present embodiment, the portion of the lower inclined plate part 58c with a dip angle on the second stopper portion 58 comprises a separate component 62 formed independently so that the stopper plate 14 is configured by press-forming the separate component 62 and other parts of the stopper plate body in different processes and integrating them with each other by welding.

Thus, by making one of the stopper portions as a separate component, it becomes possible to easily manufacture the stopper plate 14 provided with the first and second stopper portions 56, 58 in a bag-like shape each having a dip angle on either side in the longitudinal direction. Also, the separate component 62 is provided with a plurality of mounting holes 64, 66, while the mounting hole 64 is fixed with a fixing nut 68. Then, using these mounting holes 64, 66 and the fixing nut 68, it is made possible to retrofit and fix in position a heat insulator cover and the like which is a separate part that reduces radiation heat from the engine by covering the engine mount 10. By configuring part of the stopper plate 14 with the separate component 62, the process of providing the downsized separate component 62 with the mounting holes 64, 66 and the fixing nut 68 and so forth is made easier.

The stopper plate 14 described above is assembled to the mount body 12 to constitute the engine mount 10, and as shown in FIG. 2 and later-described FIG. 14, the engine mount 10 is arranged with respect to the power unit 38 in such a way that the longitudinal direction of the engine mount 10 is aligned in position with a diagonal line, that is, with the first and second stopper portions 56, 58 arranged one above the other in the diagonal direction. Under these conditions of the pair of engine mounts 10, 10 being mounted to a vehicle, the pair of engine mounts 10, 10 cooperate with each other to support the power unit 38 in a vibration damping manner, while the amount of deformation of the power unit 38 is restricted in a buffering manner.

Especially, the stopper plate 14 is formed with the first and second stopper portions 56, 58 each in a bag-like configuration comprising the upper inclined plate parts 56a, 58a, hanging plate parts 56b, 58b, lower inclined plate parts 56c, 58c, and the side plate portions 60, 60 on both sides, which are placed opposite to each other on the opening sides. Then, the first and second stopper portion 56, 58 are arranged to externally cover the first and second abutting portions 24, 26, respectively, that are provided at the pair of opposing sides of the second mounting plate member 20.

This allows the first and second stopper portions 56, 58 to be arranged to oppose the first and second abutting portions 24, 26, respectively, at a given distance in all of the up-down and left-right directions A, B, C and D (see FIG. 2) as well as the front-back direction of the vehicle, which is perpendicular to the page of FIG. 2. Therefore, in the first and second stopper mechanisms comprising the first and second stopper portions 56, 58 and the first and second abutting portions 24, 26, the stopper function can be exerted that limits the amount of relative displacement between the stopper portions 56, 58 and the abutting portions 24, 26 based on abutment against each other via the first and second rubber buffers 28, 30, thus achieving a compact and effective stopper mechanism.

Especially, the lower inclined plate parts 56c, 58c, which are dip angle portions of the stopper portions 56, 58, are made to abut against the first and second abutting portions 24, 26, respectively, from behind, which can achieve an effective stopper function even in the separating direction of the first mounting plate member 18 and the second mounting plate member 20.

Meanwhile, at both sides of the stopper plate 14 in the longitudinal direction, the first and seconds stopper portions 56, 58 provided with the lower inclined plate parts 56c, 58c each having a dip angle are formed in a bag-like shape opening toward each other. Then, the stopper function in multiple directions described above is made to work by having the first and second abutting portions 24, 26 arranged in an approximate state of containment upon being inserted into these bag-like spaces of the first and second stopper portions 56, 58. Therefore, as shown in FIG. 10, the dimension LA of the downward opening of the stopper plate 14 is made smaller than the dimension LB in the longitudinal direction of the mount body 12 having the first and second abutting portions 24, 26.

For that reason, in the assembly process of the stopper plate 14 and the mount body 12, an attempt to overlap the stopper plate 14 with the first mounting plate member 18 of the mount body 12 will be thwarted because at least one of the first and second stopper portions 56, 58 will be caught by either of the first and second abutting portions 24, 26, which causes the assembly to fail.

Therefore, in the assembly process of the stopper plate 14 and the mount body 12, as shown in FIGS. 11A to 11D that illustrate the process, the tip of the lower inclined plate part 56c of the first stopper portion 56, which is one of the opening edges of the stopper plate 14 in the longitudinal direction is inserted below the second mounting plate member 20 all the way to the inside of the first abutting portion 24, and using this tip position as an approximate rotation center a, the other side of the stopper plate 14 in the longitudinal direction is gradually rotated to be overlapped with the first mounting plate member 18. In other words, based on the position of the stopper plate 14 being overlapped with the first mounting plate member 18 as a reference point, tilting of the stopper plate 14 in the direction to lift up its first insertion hole 52 side with respect to the first mounting plate member 18 about the rotation center a is allowed.

The assembling process of the stopper plate 14 involving tilting rotation thereof to the first mounting plate member 18 described above can be achieved by a special structure comprising the mounting bolt 32 provided on the first mounting plate member 18, the first and second positioning protrusions 34, 36, the bolt insertion hole 50 in the central plate portion 48 of the stopper plate 14 for bolt insertion, and the first and second insertion holes 52, 54 where the protrusions are inserted.

That is, in the first mounting plate member 18, the first positioning protrusion 34 is provided on the side of the stopper plate 14 further from the tilting rotation center a, while the second positioning protrusion 36 is provided on the side of the stopper plate 14 closer to the tilting rotation center a relative to the mounting bolt 32.

Meanwhile, in the stopper plate 14, the first insertion hole 52 is formed in a size that fits the first positioning protrusion 34 about an entire circumference of the outer peripheral face to perform the positioning action against each other. Also, the second insertion hole 54 can be engaged with the second positioning protrusion 36 to perform the positioning action in the width direction of the stopper plate 14 perpendicular to the tilting rotation direction (up-down direction in FIG. 8), but in the direction perpendicular to it (left-right direction in FIG. 8), the second positioning protrusion 36 is formed with enough dimensional clearance to allow it to move within the second insertion hole 54. Furthermore, as in the case of the second insertion hole 54, the bolt insertion hole 50 can be engaged with the mounting bolt 32 to perform the positioning action in the width direction of the stopper plate 14, whereas in the longitudinal direction of the stopper plate 14 perpendicular to it, the mounting bolt 32 is formed with enough dimensional clearance to allow it to move within the bolt insertion hole 50.

In the present embodiment, the first insertion hole 52 is made in a circular shape with a slightly larger inner diameter than the maximum outer diameter of the first positioning protrusion 34. Also, the second insertion hole 54 is made in an elliptical shape having a slightly larger short-axis dimension than the maximum outer diameter of the second positioning protrusion 36 and a long-axis dimension no less than twice that of the maximum outer diameter. Meanwhile, the bolt insertion hole 50 is made in an elliptical shape having a slightly larger short-axis dimension than the maximum outer diameter of the mounting bolt 32 and a long-axis dimension no less than twice that of the maximum outer diameter.

Figure 11A:
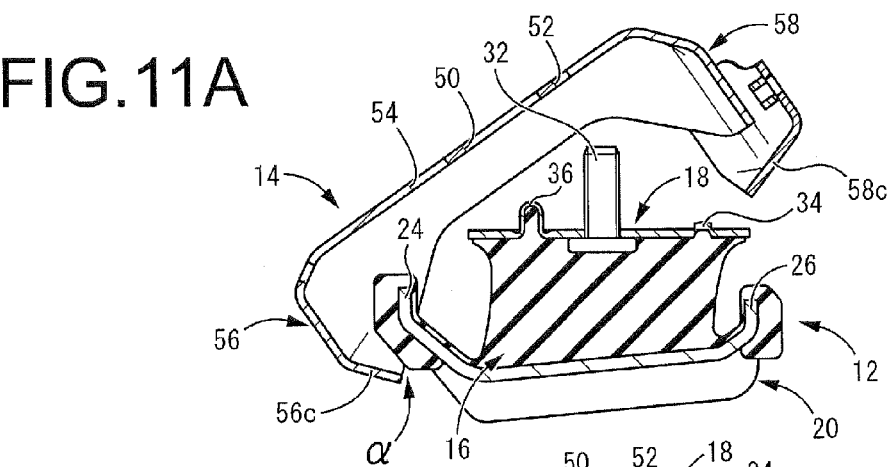
FIGS. 11A-11D are views suitable for explaining the assembly process of the stopper plate shown in FIG. 7 to the mount body shown in FIG. 6 in the order of FIG. 11A to 11D.
Figure 11B:
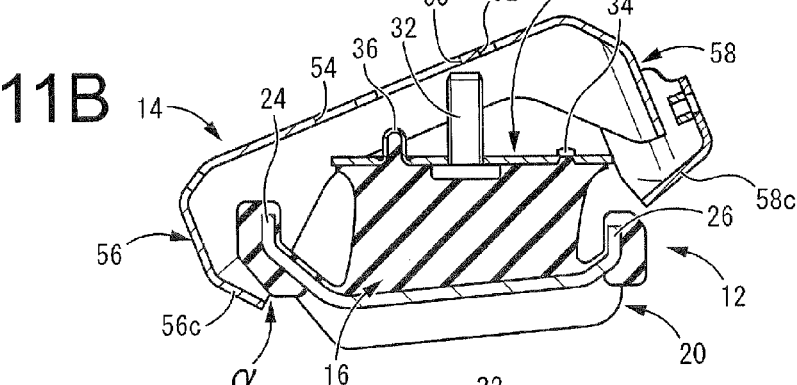
Figure 11C:
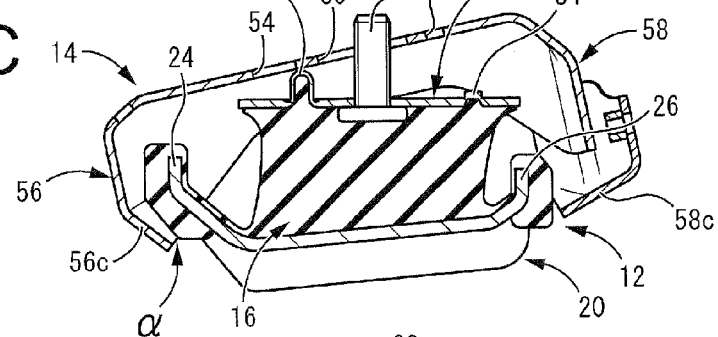

This allows the mounting bolt 32 of the first mounting plate member 18 to be inserted into the bolt insertion hole 50 of the stopper plate 14 made inclined against the first mounting plate member 18 to be assembled thereto in the process of FIGS. 11B to 11C shown in the magnified diagrams while maintaining the relative inclination. Likewise, in the process of FIGS. 11C to 11D, the second positioning protrusion 36 of the first mounting plate member 18 can be inserted into the second insertion hole 54 of the stopper plate 14 to be assembled thereto.

Figure 11D:
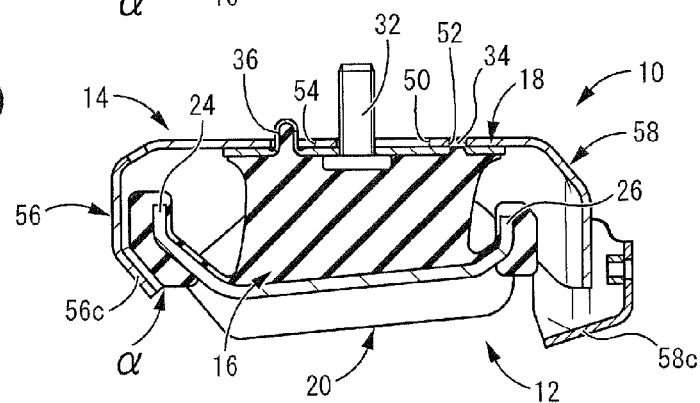
Figure 12:
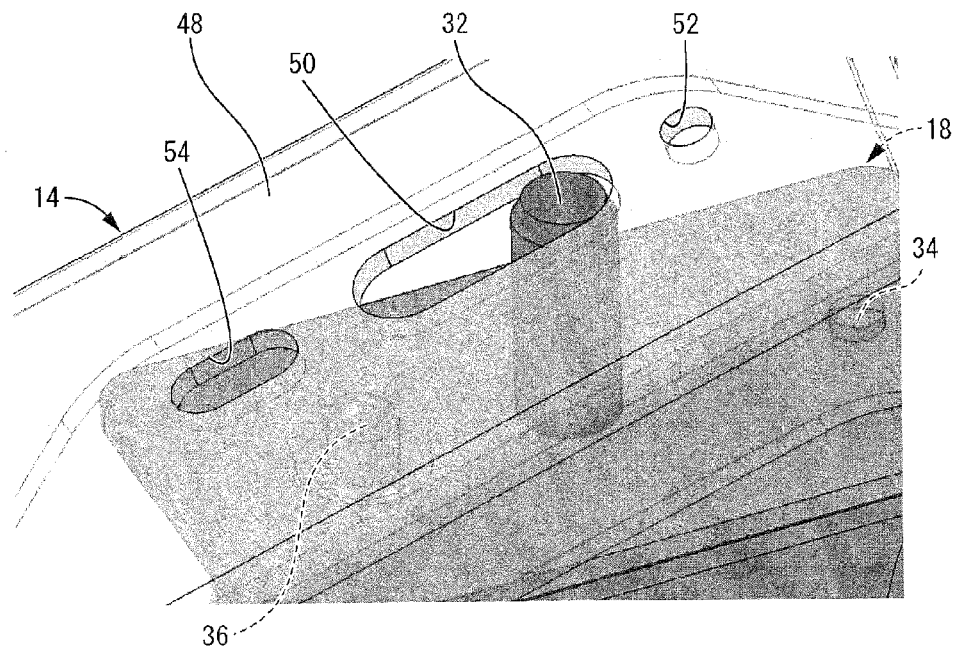
FIG. 12 is a perspective view suitable for explaining the process of FIG. 11B.
Figure 13:
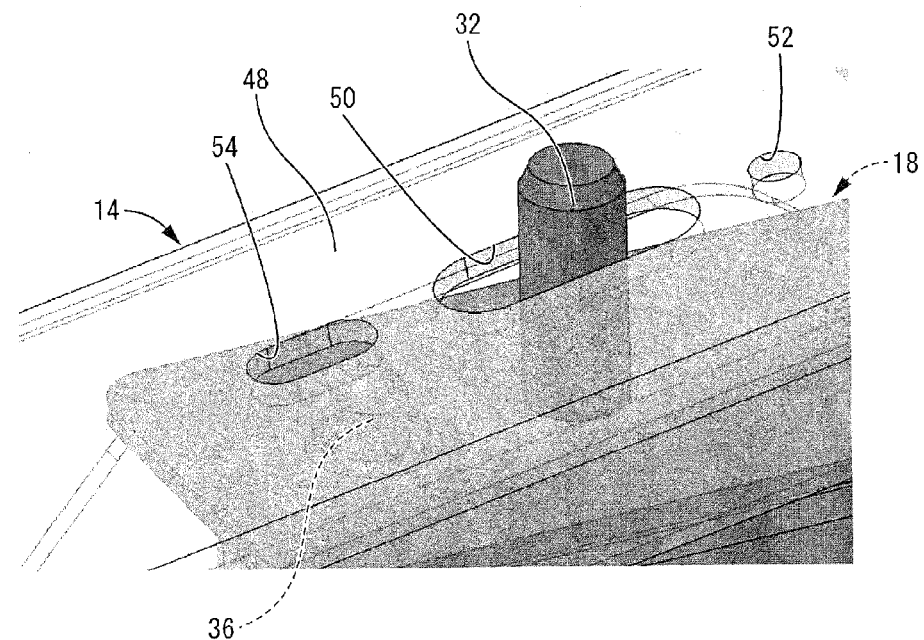
FIG. 13 is a perspective view suitable for explaining the process of FIG. 11C.

Then, as shown in FIG. 11D, once the stopper plate 14 starts to tilt rotationally until the bottom end of the lower inclined plate part 58c in the second stopper portion 58 of the stopper plate 14 passes through the protrusion of the second abutting portion 26 of the mount body 12, the portion of the minimum dimension LA between the first and second stopper portions 56, 58 of the stopper plate 14 passes through the portion of the maximum dimension LB between the first and second abutting portions 24, 26 of the second mounting plate member 20. Thus, it becomes possible to relatively displace the stopper plate 14 over the first mounting plate member 18 of the mount body 12 approximately in the planar direction. Also, since the second insertion hole 54 and the bolt insertion hole 50 where the second positioning protrusion 36 and the mounting bolt 32 are inserted are made in an elliptical shape, the second positioning protrusion 36 and the mounting bolt 32 are allowed to move within the insertion holes 54, 50, respectively, in the longitudinal direction of the ellipse.

Therefore, as shown in FIG. 11D, even if there is a misalignment after completing the operation of tilting rotation of the stopper plate 14 and aligning it approximately parallel to the first mounting plate member 18, the first positioning protrusion 34 can be aligned in position and fitted with the first insertion hole 52 by means of relatively displacing the stopper plate 14 parallel to the first mounting plate member 18. This allows the stopper plate 14 to be overlapped with the first mounting plate member 18 in close contact to be assembled thereto as shown in FIGS. 1 to 5.

Then, as shown in FIG. 2 and others under an assembled condition, by having the first positioning protrusion 34 fitted into the first insertion hole 52 all around the circumference, the first mounting plate member 18 and the stopper plate 14 are accurately aligned in position in such fitted position. At the same time, by having the second positioning protrusion 36 fitted and engaged in the width direction of the plate, the first mounting plate member 18 and the stopper plate 14 are aligned in position in the circumferential direction around the center of the fitting between the first positioning protrusion 34 and the first insertion hole 52. The first mounting plate member 18 and the stopper plate 14 can be aligned in position in an accurate and stable manner and prevented from being misaligned based on the synergetic positioning action between the first and second positioning protrusions 34, 36 and the first and second insertion holes 52, 54. Especially, since the second positioning protrusion 36 is formed at a height that allows it to penetrate through the stopper plate 14, which is inserted into the bolt hole formed at a position corresponding to the power unit 38, the first mounting plate member 18 is also positioned against the power unit 38 by virtue of the second positioning protrusion 36.

Especially, since the second positioning protrusion 36 is arranged on the opposite side to the first positioning protrusion 34 across the mounting bolt 32, the distance between the first positioning protrusion 34 and the second positioning protrusion 36 can be made large enough. Therefore, the positioning accuracy between the first mounting plate member 18 and the stopper plate 14 and the strength thereof based on the cooperation between the first and second positioning protrusions 34, 36 can be achieved more effectively.

Also, in the present embodiment, since the mounting bolt 32 and the second positioning protrusion 36 are arranged in series, each of which is exerting fitting and locking forces upon the bolt insertion hole 50 and the second insertion hole 54, thereby determining the positioning of the first positioning protrusion 34 and the first insertion hole 52 in the circumferential direction. This enables to further improve the strength and reliability of the positioning action by the first positioning protrusion 34 and the first insertion hole 52.

In addition, the first positioning protrusion 34 of the present embodiment is positioned further away from the rotation center a than the second positioning protrusion 36, while the height of the first positioning protrusion 34 is made smaller than that of the second positioning protrusion 36. This enables to effectively avoid any interference with the tilting operation of the stopper plate 14 by the first positioning protrusion 34 as shown in FIG. 11, while the first positioning protrusion 34 can be fitted into the first insertion hole 52 all around the circumference, thus achieving a high-precision positioning effect.

In a state of being mounted to a vehicle as shown in FIG. 2, the stopper plate 14 is firmly positioned and fitted to the first mounting plate member 18 due to the fastening between the mounting bolt 32 and a mounting nut 70. Then, based on such fastening, the stopper plate 14 is made into a structure substantially integrated with the first mounting plate member 18, thus enabling to achieve the stopper function in a stable manner.

Figure 14:
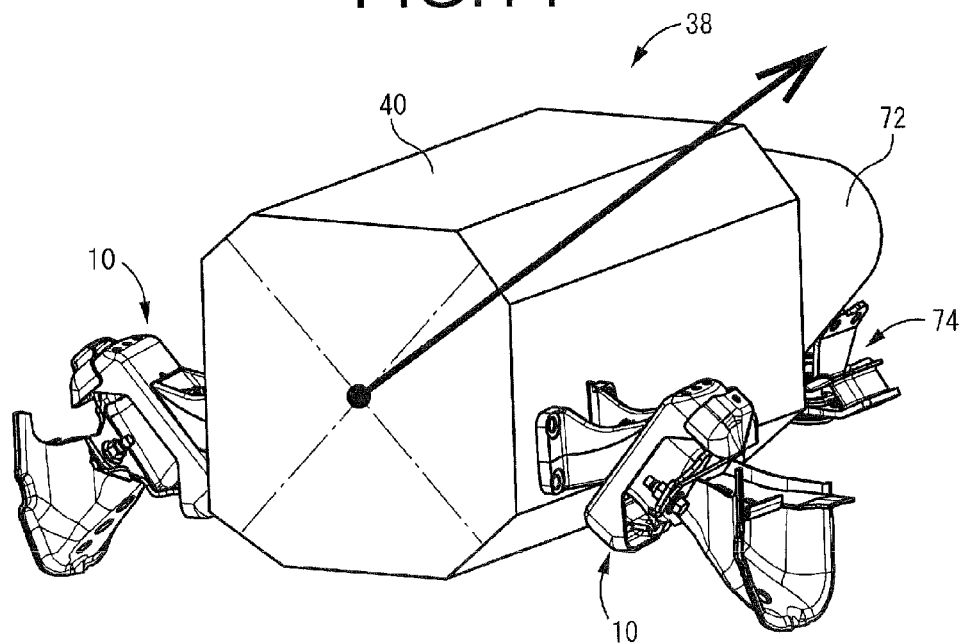
FIG. 14 is a perspective view illustrating a vibration damping support structure to support an automobile power unit with respect to a vehicle body using the engine mount shown in FIG. 1.
Figure 15:
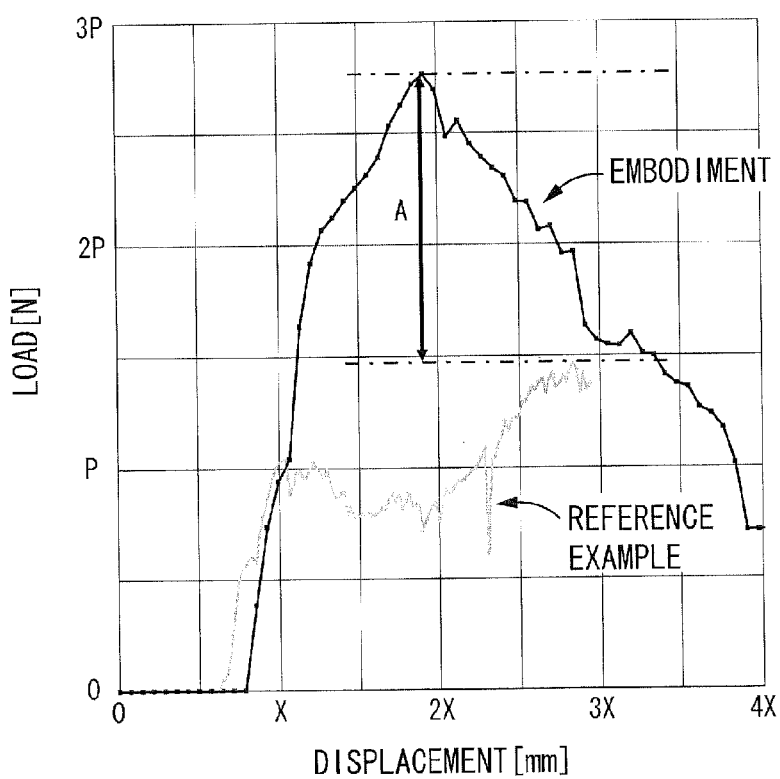
FIG. 15 is a graph showing load-deflection characteristics measured for the load input to the vibration damping support structure shown in FIG. 14 in the arrow direction at the time of collision together with a reference example.
Figure 16:
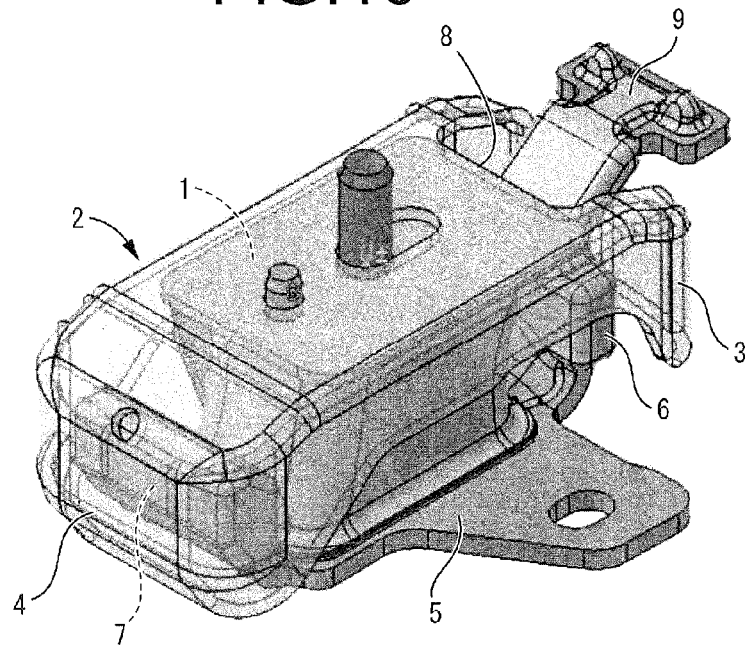
FIG. 16 is a transparent perspective view showing the vibration damping device as the reference example designed by the inventor of the present invention.
Figure 17:
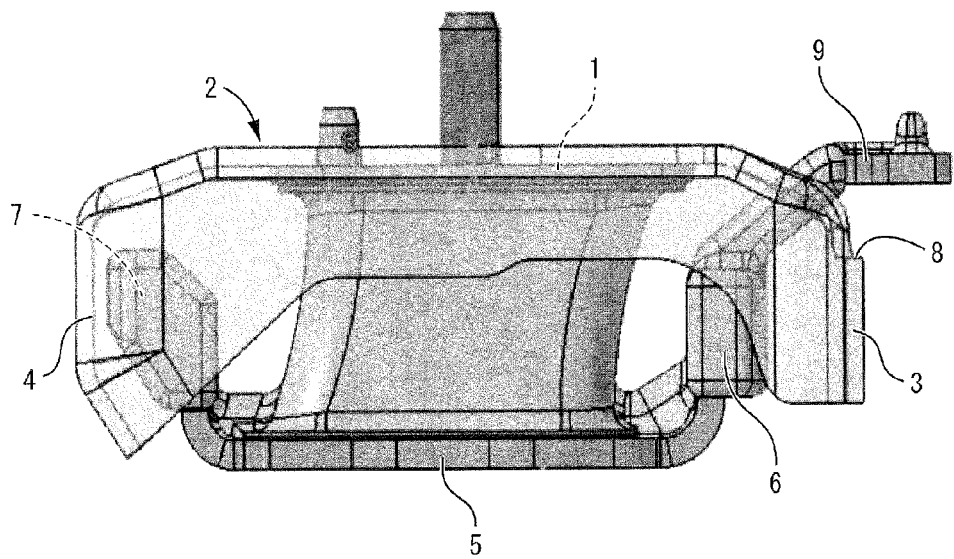
FIG. 17 is a transparent front view of the vibration damping device shown in FIG. 16.

As shown in FIG. 14, in the vibration damping support structure to support the power unit 38 by a three-point suspension system with respect to the vehicle body (not shown) where the front-side of the power unit 38 of an FR type vehicle is supported in a vibration damping manner using the pair of engine mount 10 with the structure according to the present embodiment while a transmission part 72 on the rear-side of the power unit 38 on the vehicle is supported by a rear-side engine mount 74, the stopper function of the engine mount 10 against load inputs at a time of vehicular collision was tested in simulation, results of which are shown in FIG. 15. In such testing, similar tests were conducted on a pair of engine mounts shown in FIGS. 16 and 17 as a reference example, the results of which are shown also in FIG. 15 as reference. In addition, the direction of load inputs at the time of vehicular collision, as shown in FIG. 14, was assumed to be the one that lifts up the central tip portion of the longitudinal-type engine 40 with a crank shaft extending back and forth on the vehicle in the backward and diagonally upward direction while slightly tilting toward the left in the width direction of the vehicle. Also, in the testing, the same conventional and publicly known rear-side engine mount was adopted for both cases of using the engine mount 10 and the engine mount of the reference example.

As evident from the test results shown in FIG. 15, it has been confirmed that the engine mount 10 of the present embodiment is capable of exhibiting nearly twice the load-bearing performance as the engine mount of the reference example, making a difference of A. Especially, both the engine mount 10 of the present embodiment and the engine mount of the reference example bring the stopper in contact at a position of displacement of 0.7 to 0.8×, while in the initial contact stage up to the load input of P, the stopper mechanism worked effectively due to almost the same load-displacement characteristics, but beyond the load input of P, the stopper function of the engine mount 10 of the reference example barely worked, whereas in the engine mount of the present embodiment, effective stopper functions were exhibited in the load range of up to 2.5 times or more than P.

Embodiments of the present invention have been described in detail above, but the present invention is not limited by those specific descriptions. For example, the first and second positioning protrusions 34, 36 are made to be easily inserted into the first and second insertion holes 52, 54 by having their tips tapered off, but they can also have a constant cross-sectional shape all along the length in the direction of protrusion.

Also, the specific shape and structure of the first and second stopper portions and the first and second abutting portions can be modified as appropriate according to the required stopper characteristics such as load input directions and the intensity of the load input. Other than retrofitting the dip angle portion to the first and second stopper portions later as a separate component taking into account the shape and size and the like of the first and second stopper portions and the first and second abutting portions, it is also possible to configure the entire stopper plate including the first and second stopper portions as an integrally molded product The length of the second insertion hole in the longitudinal direction is not particularly limited, and an integral insertion hole can be formed that communicates with the bolt insertion hole, for example by means of elongating it toward the bolt insertion hole.

It is also possible to make the positioning function work between the first mounting plate member 18 and the stopper plate 14 using the locking mechanism of the first and second positioning protrusions 34, 36 against the first and second insertion holes 52, 54. That is, the mounting bolt does not have to perform the positioning function within the bolt insertion hole, but can be made in a shape to allow the mounting bolt to move in all directions within the bolt insertion hole. This makes it easy to adjust the mounting position of the engine mount 10 to the power unit 38.

Furthermore, the shape of the through hole 46 of the mounting piece 42 can be made in such a way that the mounting position of the engine mount 10 is made adjustable against the vehicle body 44, for example by making the hole in an elongated shape. Especially, it is preferable that the bolt insertion hole 50 and the through hole 46 be made in an elongated shape and the longitudinal directions of both holes be aligned in mutually perpendicular directions, which can enhance the degree of freedom in the directional positioning of the engine mount 10 against the power unit 38 and the vehicle body 44.

Moreover, the specific structure of the mount body is not particularly limited, and it is also possible to adopt as a mount body a fluid-filled vibration damping device with a non-compressible fluid sealed therein.

KEYS TO SYMBOLS

10: Engine mount (vibration damping device); 12: Mount body; 14: Stopper plate; 16: Main rubber elastic body; 18: First mounting plate member; 20: Second mounting plate member; 24: First abutting portion; 26: Second abutting portion; 32: Mounting bolt: 34: First positioning protrusion; 36: Second positioning protrusion; 38: Power unit (one component to be connected in a vibration damping manner); 40: Engine; 44: Vehicle body (the other component to be connected in a vibration damping manner); 50: Bolt insertion hole; 52: First insertion hole; 54: Second insertion hole; 56: First stopper portion; 58: Second stopper portion; 56a, 58a: Upper inclined plate part; 56b, 58b: Hanging plate part; 56c, 58c: Lower inclined plate part (dip part); 60: Side plate portion; 62: Separate component

The invention claimed is:

1. A device, comprising:
an engine of a power unit; and
a vibration damping device, the vibration damping device comprising:
first and second mounting plate members configured to attach to respective components to be connected in a vibration damping manner while being placed opposite to each other;
a main rubber elastic body connecting the first and second mounting plate members;
a stopper plate of approximately rectangular shape being overlapped and attached on the first mounting plate member;
abutting portions provided to the second mounting plate member;
first and second stopper portions being provided to a pair of opposing sides of the stopper plate so as to limit an amount of relative displacement between the first and second mounting plate members by abutment against the respective abutting portions;

a hanging plate part that extends from each of the first and second stopper portions provided to the respective opposing sides of the stopper plate toward the second mounting plate member;

a dip part sloping inward from a tip of the hanging plate part;

a pair of side plate portions each protruding toward the second mounting plate member being provided to another pair of opposing sides of the stopper plate so as to extend between the first and second stopper portions and close an opening to each side of the first and second stopper portions;

a mounting bolt protruding outward being provided to the first mounting plate member;

a bolt insertion hole for insertion of the mounting bolt being provided to the stopper plate;

a first positioning protrusion and a second positioning protrusion with a protrusion height greater than that of the first positioning protrusion being provided to the first mounting plate member so as to be located on both sides of the mounting bolt in a direction of opposition of the first and second stopper portions of the stopper plate so that the first positioning protrusion positions the stopper plate with respect to the first mounting plate member while the second positioning protrusion positions the first mounting plate member with respect to one of the components to be connected in a vibration damping manner; and first and second insertion holes being provided to the stopper plate on both sides of the bolt insertion hole at locations corresponding to the respective first and second positioning protrusions, wherein the first insertion hole fits the first positioning protrusion about an entire circumference, the bolt insertion hole and the second insertion hole each have an elongated shape extending in a direction of opposition of the first and second stopper portions of the stopper plate so that the stopper plate is allowed to tilt with respect to the first mounting plate member in a direction of lifting its side on the first insertion hole while the second positioning protrusion is positioned with respect to the second insertion hole in a direction of opposition of the pair of side plate portions of the stopper plate, and the vibration damping device is located diagonally below the engine of the power unit on each side across the engine and arranged obliquely with the first and second stopper portions located one above another in a diagonal direction so as to constitute an engine mount.

2. The device according to claim 1, wherein the dip part of the second stopper portion is constituted by a separate component attached to the stopper plate.

3. A vibration damping device comprising:

first and second mounting plate members configured to attach to respective components to be connected in a vibration damping manner while being placed opposite to each other;

a main rubber elastic body connecting the first and second mounting plate members;

a stopper plate of approximately rectangular shape being overlapped and attached on the first mounting plate member;

abutting portions provided to the second mounting plate member;

first and second stopper portions being provided to a pair of opposing sides of the stopper plate so as to limit an amount of relative displacement between the first and second mounting plate members by abutment against the respective abutting portions;

a hanging plate part that extends from each of the first and second stopper portions provided to the respective opposing sides of the stopper plate toward the second mounting plate member;

a dip part sloping inward from a tip of the hanging plate part;

a pair of side plate portions each protruding toward the second mounting plate member being provided to another pair of opposing sides of the stopper plate so as to extend between the first and second stopper portions and close an opening to each side of the first and second stopper portions;

a mounting bolt protruding outward being provided to the first mounting plate member;

a bolt insertion hole for insertion of the mounting bolt being provided to the stopper plate;

a first positioning protrusion and a second positioning protrusion with a protrusion height greater than that of the first positioning protrusion being provided to the first mounting plate member so as to be located on both sides of the mounting bolt in a direction of opposition of the first and second stopper portions of the stopper plate so that the first positioning protrusion positions the stopper plate with respect to the first mounting plate member while the second positioning protrusion positions the first mounting plate member with respect to one of the components to be connected in a vibration damping manner; and first and second insertion holes being provided to the stopper plate on both sides of the bolt insertion hole at locations corresponding to the respective first and second positioning protrusions, wherein the first insertion hole fits the first positioning protrusion about an entire circumference, and the bolt insertion hole and the second insertion hole each have an elongated shape extending in a direction of opposition of the first and second stopper portions of the stopper plate so that the stopper plate is allowed to tilt with respect to the first mounting plate member in a direction of lifting its side on the first insertion hole while the second positioning protrusion is positioned with respect to the second insertion hole in a direction of opposition of the pair of side plate portions of the stopper plate.

4. The vibration damping device according to claim 3, wherein the mounting bolt is positioned with respect to the bolt insertion hole in the direction of opposition of the pair of side plate portions of the stopper plate.

5. The vibration damping device according to claim 3, wherein at least one of the first positioning protrusion and the second positioning protrusion has a tapered shape where a cross sectional area of its tip portion is smaller than that of its base portion.

6. The vibration damping device according to claim 3, wherein the protrusion height of the first positioning protrusion is set at a level not protruding beyond an outer face of the stopper plate.

* * * * *